(12) United States Patent
Lee (10) Patent No.: US 7,808,863 B2
(45) Date of Patent: Oct. 5, 2010

(54) LASER/DETECTOR DEVICE FOR OPTICAL RECORDING WITH ADJUSTABLE DETECTOR POSITION

(76) Inventor: Wai-Hon Lee, 1245 Magdalena Ct., Los Altos, CA (US) 94024

(*) Notice: Subject to any disclaimer, the term of this patent is extended or adjusted under 35 U.S.C. 154(b) by 1113 days.

(21) Appl. No.: 10/832,921

(22) Filed: Apr. 26, 2004

(65) Prior Publication Data
US 2005/0237871 A1    Oct. 27, 2005

(51) Int. Cl.
*G11B 7/00* (2006.01)
(52) U.S. Cl. ............ 369/44.32; 369/53.11; 369/112.15; 369/112.29
(58) Field of Classification Search ............ None
See application file for complete search history.

(56) References Cited

U.S. PATENT DOCUMENTS

| | | |
|---|---|---|
| 4,731,772 A | 3/1988 | Lee |
| 4,757,197 A | 7/1988 | Lee |
| 5,285,062 A | 2/1994 | Lee |
| 5,710,672 A | 1/1998 | Roberts et al. |
| 5,717,674 A | 2/1998 | Mori et al. |
| 5,727,009 A | 3/1998 | Tajiri et al. |
| 6,188,062 B1 * | 2/2001 | Lee .................. 250/237 G |
| 6,211,511 B1 | 4/2001 | Shih et al. |
| 6,587,481 B1 * | 7/2003 | Seong et al. ............. 372/9 |
| 6,977,951 B2 * | 12/2005 | Matsubara et al. ....... 372/43.01 |
| 2002/0018432 A1 | 2/2002 | Ohuchida |
| 2002/0093893 A1 | 7/2002 | Matsuda |

FOREIGN PATENT DOCUMENTS

| | | |
|---|---|---|
| EP | 0202689 A2 | 11/1986 |
| EP | 0860819 A2 | 8/1998 |
| EP | 1592000 A2 | 2/2005 |
| JP | 64046243 | 2/1989 |
| JP | 06036338 | 10/1994 |
| JP | 2000-76689 A | 3/2000 |
| JP | 2001-236681 A | 8/2001 |
| JP | 2003-233924 A | 8/2003 |

* cited by examiner

*Primary Examiner*—Jorge L Ortiz Criado
(74) *Attorney, Agent, or Firm*—Townsend and Townsend and Crew, LLP (57) ABSTRACT

An assembly structure and method for an integrated laser/detector device with a mirror at an angle to redirect the laser beam to a medium. The mirror is not attached to the circuit board with the laser/detector as in the prior art, but rather is mounted separately in the housing immediately above the circuit board. This allows the circuit board to be moved laterally toward and away from the mirror during assembly to adjust the reflected beam along a first direction so that it contacts the photodetector. A hologram lens is mounted above the mirror, and can be rotated to adjust the reflected beam to hit the photodetector along a second, orthogonal direction. In one embodiment, two laser beams are generated, and two hologram lenses are used to separately adjust the two beams.

10 Claims, 11 Drawing Sheets

--PRIOR ART--

FIG. 1

--PRIOR ART--

FIG. 2

--PRIOR ART--

FIG. 3

--PRIOR ART--

LASER/DETECTOR DEVICE FOR OPTICAL RECORDING WITH ADJUSTABLE DETECTOR POSITION

CROSS-REFERENCES TO RELATED APPLICATIONS

NOT APPLICABLE

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

U.S. Pat. No. 4,731,772 and U.S. Pat. No. 4,757,197 describe the integration of a semiconductor laser device and a photo-detector in the same package for reading information from compact discs (CD). At that time optical heads used in compact disc players had only one laser. However, U.S. Pat. No. 4,757,197 anticipated that someday such a reading device might have two semiconductors in the same package.

Figure 1:
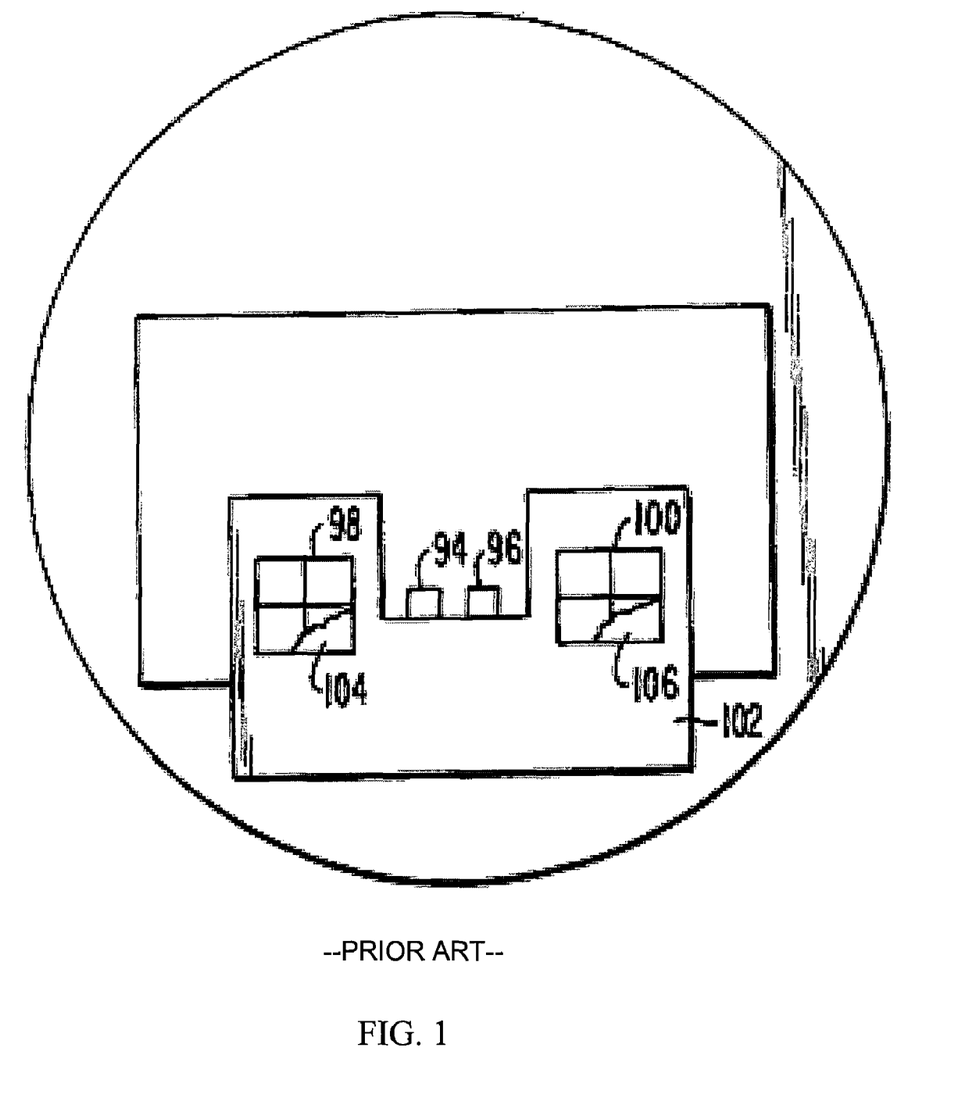
FIG. 1 is prior art dual laser device according to U.S. Pat. No. 4,757,197.

FIG. 1 shows the two lasers package from U.S. Pat. No. 4,757,197. Two laser chips 94 and 96 are mounted on a first surface of a heatsink 102. Two detectors 98 and 100 are mounted on a surface normal to the first surface of the heatsink 102. Polarization filters 104 and 106 are used to separate the signals from the separate detectors. A hologram (not shown) diffracts the returned light, which originated from laser 96, to detector 100. The returned light which originated from laser 94 is diffracted to detectors 98 and 100.

Figure 2:
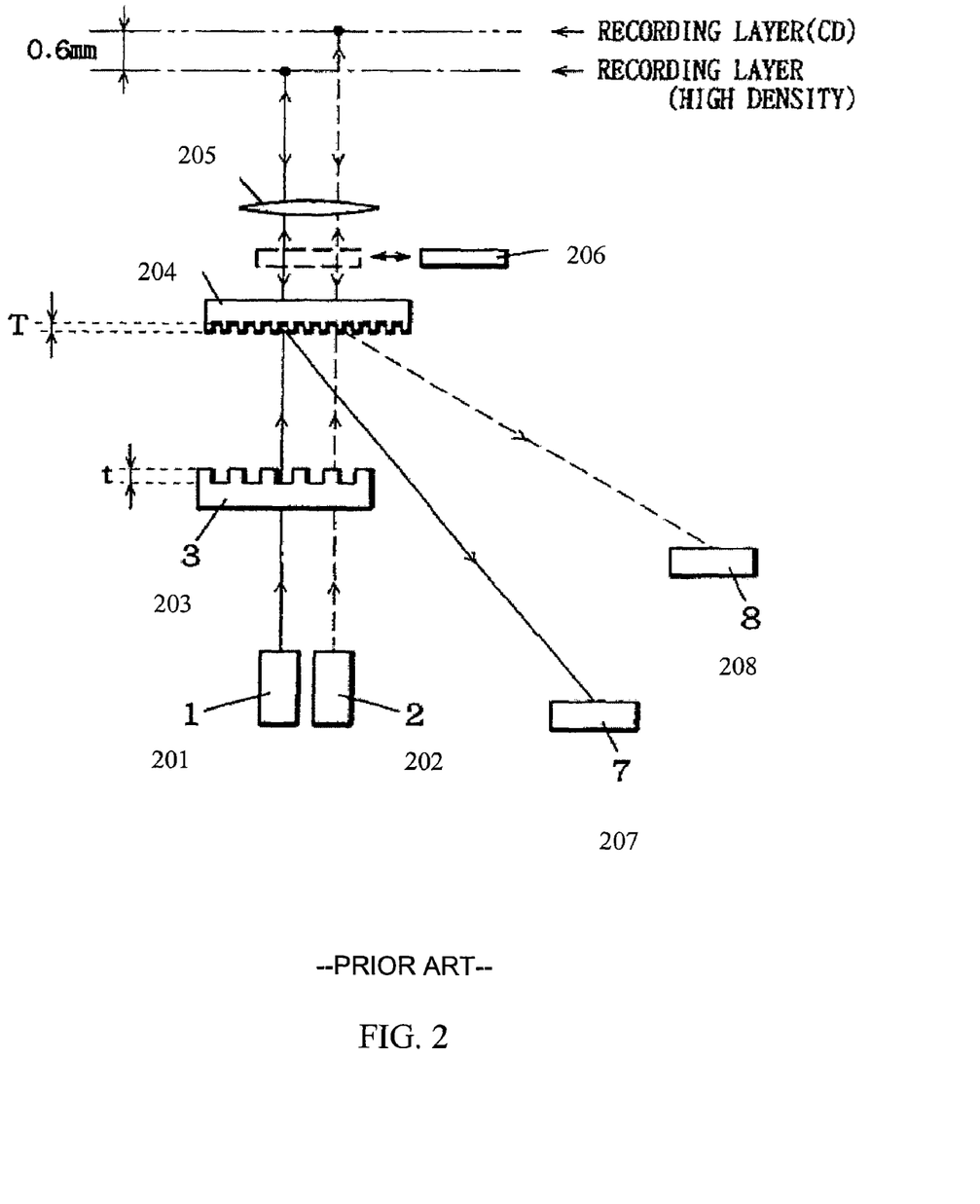
FIG. 2 is prior art dual laser device according to U.S. Pat. No. 5,717,674.

With the development of digital versatile disks (DVD), the pits on the disks can only be read using a short wavelength laser. However, the recordable compact discs (CD-R) contain a dye which can only be read by a long wavelength laser. Consequently, all the optical heads used in DVD/CD players today contain two lasers, one has wavelength near 780 nm and the other has wavelength near 650 nm. U.S. Pat. No. 5,717,674, which issued in 1998, described a similar concept for construction of an integrated laser/detector device containing two lasers. This prior art is shown in FIG. 2. Laser 201 is the short wavelength laser. Its returned light from the high density recording layer is diffracted by hologram 204 to detector 207. Laser 202 is the long wavelength laser. Its returned light, after being reflected by the CD recording layer, is diffracted by the same hologram 204 to detector 208. Objective lens 205 is used to focus the laser light on the surface of the recording layers. As shown in FIG. 2, the high density recording layer is separated from the CD recording layer by a distance of 0.6 mm. Aberration correction plate 206 is inserted below the objective lens when the information on the CD recording layer is being read. The thickness t of the grating 203 is selected so that its structure is invisible to laser 201. The thickness T of hologram 204 is selected to have more light returned to detector 207.

U.S. Pat. No. 5,717,674 differs from U.S. Pat. No. 4,757,197 in that the detectors 207 and 208 are on the same side of the lasers, whereas the detectors 98 and 100 of the '197 patent (FIG. 1) are on either side of the lasers. Furthermore, detectors 98 and 100 are on the same plane relative to the optical axis whereas detectors 207 and 208 are on different planes.

Figure 3:
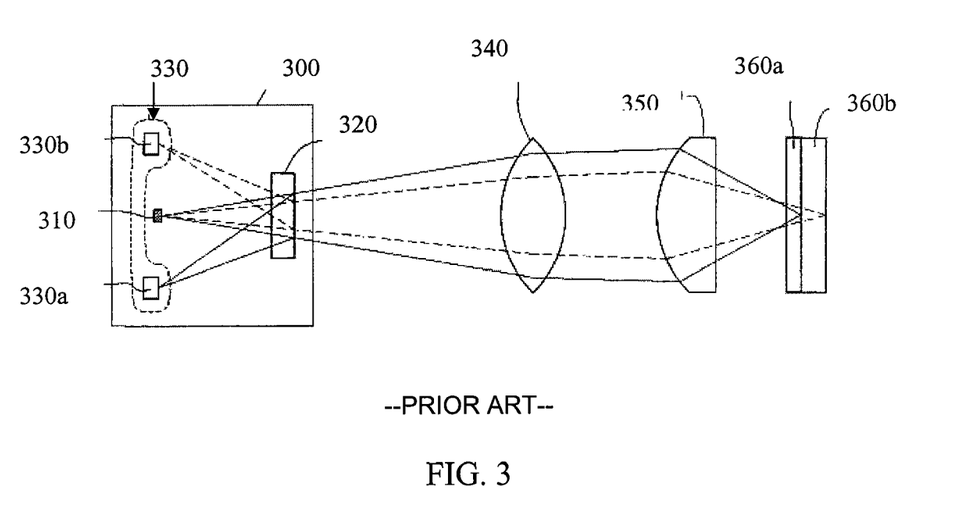
FIG. 3 is prior art dual laser beam device according to U.S. Pat. No. 6,211,511.

U.S. Pat. No. 6,211,511 is another recent patent describing an integrated laser/detector device for DVD optical heads, which is shown in FIG. 3. The integrated device 300 contains a laser chip 310, which can emit two wavelengths of light. On either side of the laser chip 310 are detectors 330$a$ and 330$b$. It also contains a hologram 320 to diffract the returned light from the disc to the respective detectors. The light emitted by the laser with a short wavelength has a large cone as shown by the solid lines. After being collimated by lens 340, it is focused by objective lens 350 to disc surface 360$a$. Light reflected by surface 360$a$ is diffracted to detector 330$a$.

Light with a longer wavelength is reflected by surface 360$b$ and is diffracted by hologram 320 to detector 330$b$. The concept in U.S. Pat. No. 6,211,511 is similar to U.S. Pat. No. 4,757,197.

All three aforementioned patents contain one hologram lens, which can only have its pattern adjusted to align one laser to one detector. After that has been done, the integrated device relies on mechanical accuracy to insure that the light from the second laser is directed to the second detector. Therefore the placements of the detector and the laser chip must be very accurate. U.S. Pat. No. 5,285,062 describes a single laser device and has a hologram lens which can be rotated to make a manufacturing adjustment so that the returned beam hits the photodetector. It is the intention of this present invention to describe an integrated laser/detector device with dual lasers in which the returned light beams from the disc can be individually aligned to the respective detectors.

Figure 4:
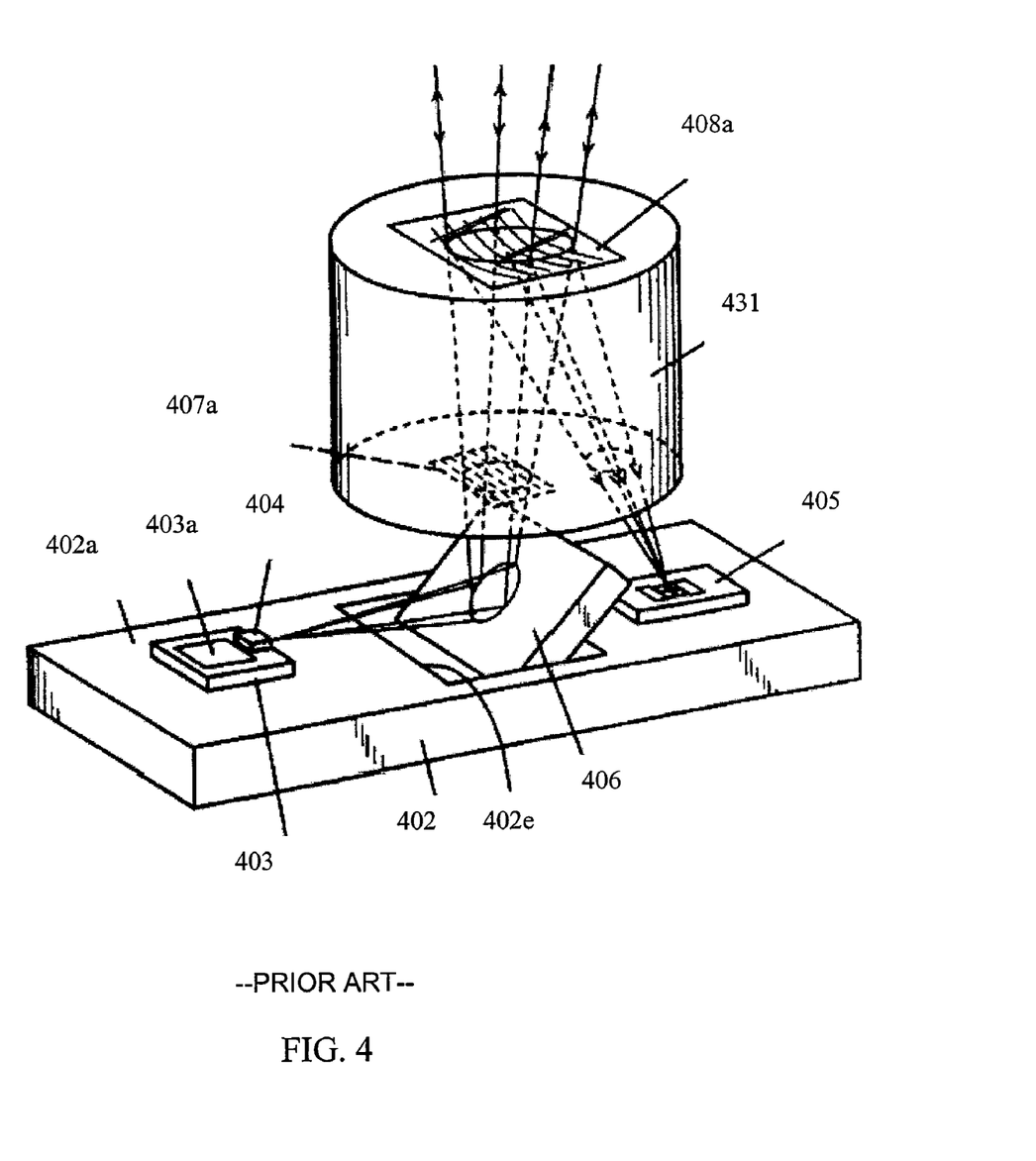
FIG. 4 is prior art dual laser device according to U.S. Pat. No. 5,727,009.

In the three aforementioned patents the lasers emit beams parallel to the optical axis of the objective lens. However, U.S. Pat. No. 5,727,009 shows a laser emission which is reflected by a 45 degree prism so that the laser beams after passing through the prism are parallel to the optical axis of the objective lens as shown in FIG. 4. A laser chip 404 is mounted on a submount 403 which also contains a photosensitive element 403$a$. Submount 403 is attached to a base 402 which has a cavity 402$e$ for the insertion of a mirror 406. A multiple element detector 405 is attached on one side of the mirror 405 opposite to the laser chip. As can be seen in FIG. 4 the laser emission is reflected upwards by mirror 406 through a diffractive component 431. On the lower side of this diffractive component 431 is a grating 407$a$, which splits the laser beam into three beams. A holographic lens 408$a$ is fabricated on the top surface of the diffractive component 431. The returned beam from the disc is diffracted by holographic lens 408$a$ to the detector 405. It is noted that the mirror 405 is fixed relative to the position of the laser chip 404 and the detector chip 405.

BRIEF SUMMARY OF THE INVENTION

The present invention provides an assembly structure and method for an integrated laser/detector device with a mirror at an angle to redirect the laser beam to a medium. The mirror is not attached to the circuit board with the laser/detector as in the prior art, but rather is mounted separately in the housing immediately above the circuit board. This allows the circuit board to be moved laterally toward and away from the mirror to adjust the position of the photodetector along a first direction so that it is hit by the reflected beam. A hologram lens is mounted above the mirror, and can be rotated (or moved up/down) to adjust the reflected beam to hit the photodetector along a second, orthogonal direction. In one embodiment, two laser beams are generated, and two hologram lenses are used to separately adjust the two beams.

In one embodiment, the laser/detector device contains two light emitting sources, a 45 degree mirror, two hologram lenses, a power monitor detector and a signal detector. The 45 degree mirror also has a grating structure on its surface so that the laser beam incident on the mirror will be split into three light beams.

BRIEF DESCRIPTION OF THE DRAWINGS

FIG. 5b is an exploded view of the first embodiment of the present invention in FIG. 5a.

DETAILED DESCRIPTION OF THE INVENTION

Figure 5A:
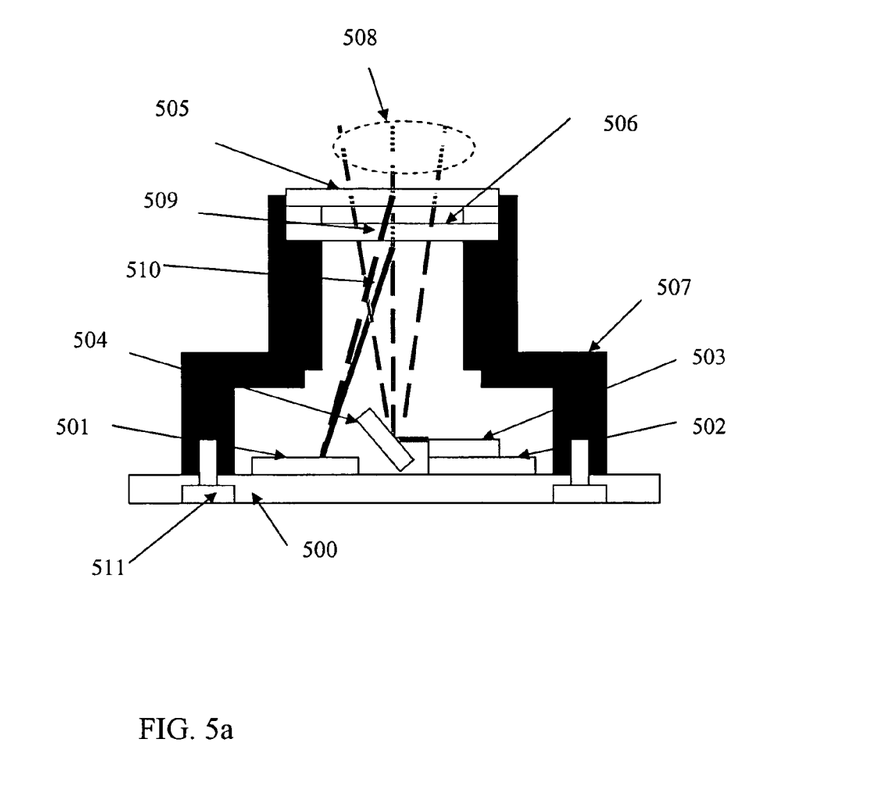
FIG. 5a is diagram of a first embodiment of the present invention.

FIG. 5a shows a first embodiment of the present invention. A laser chip 503 has two light emissions with different wavelengths or two laser chips with different wavelengths. Laser chip 503 is bonded to submount 502, which also contains a light sensitive element for detecting the back emissions from the lasers 503. A signal detector 501 and the submount 502 are both mounted on a circuit board 500. The circuit board 500 is temporarily attached to a housing 507 with pins 511a and 511b. A mirror 504 is mounted inside housing 507 over circuit board 500. The surface of the mirror 504 is corrugated so that the incident light from the laser is split into three or more beams as indicated by 508 and propagates along the center axis of the housing 507. Hologram lenses 505 and 506 are inserted into the housing at the top. The hologram lenses are fabricated in such a way (as known by those of skill in the art) that the structure is visible only to one wavelength of the laser beams. Thus, each hologram lens will diffract a specific wavelength of returned light to the quadrant detector 501.

The design of this present invention allows the movement of the laser chips perpendicular to the 45 degree mirror 504 without changing the optical axis of the light beam. In manufacturing this integrated device, by placing the detectors 501 and 502 on the circuit board, it is unavoidable that placement errors will occur. As a result, the returned beams diffracted by the holograms lens 505 and 506 may miss the quadrant detector on chip 501. The design of this present invention allows the circuit board 500 to be moved along the length direction (from left to right in the figure) until the detectors are under the returned light beam 510. Moving the laser closer or farther from the mirror doesn't affect the position of the reflected beam. This adjustment makes the distance between the detectors and the center axis exactly as required by position of the returned beam as diffracted by the hologram lens. There is also a possible error in placement in an orthogonal direction (in and out of the page of the figure). This second positional error is corrected by rotating one of the hologram lenses, 505 or 506. When the dual lasers are die bonded separately on the submount 503, there is additional error resulting from inaccurate placement of the laser chips relative to each other. Therefore, after the detector 501 is aligned to the returned light beam from a first laser, the second hologram lens is then rotated and/or moved up and down to make the returned beam from the second laser chip centered on the detector. After all the adjustments are done, epoxy is applied to fix the circuit board 500 and hologram lenses 505 and 506 permanently to the housing 507.

Figure 5B:
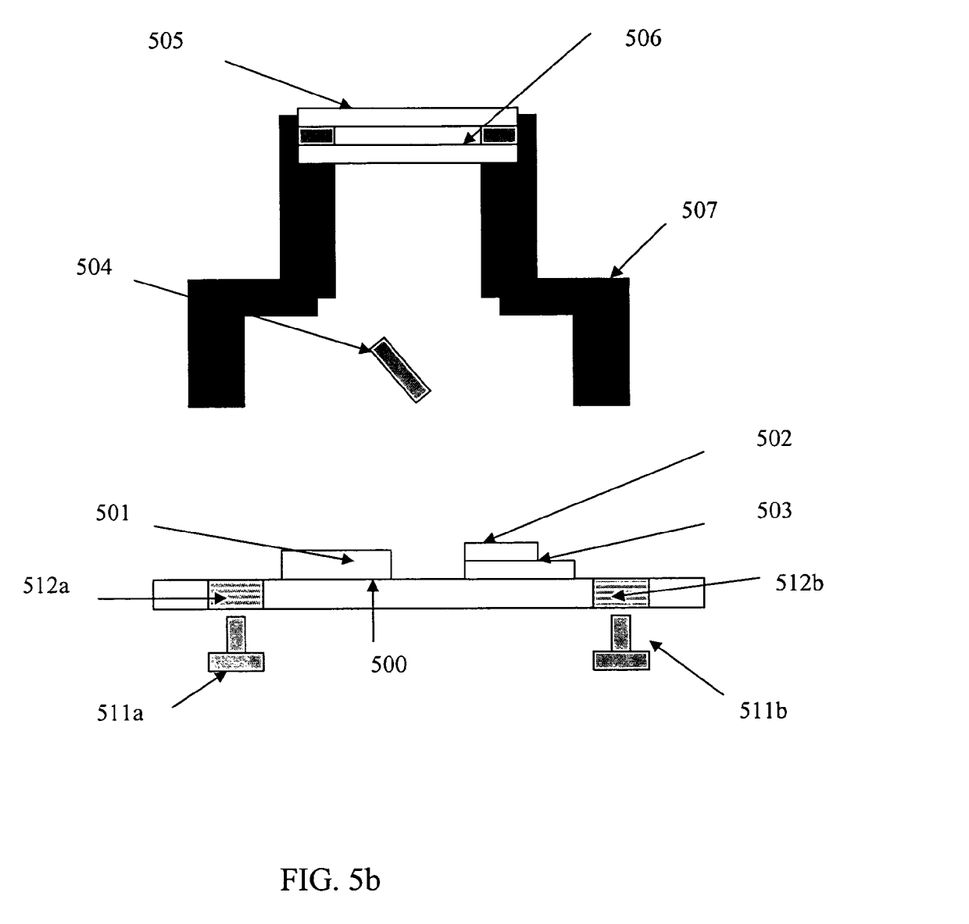

The exploded view in FIG. 5(b) shows the manufacturing process for the integrated device of the present invention. The mirror 504 is attached permanently to the housing 507. This can be done by gluing the mirror to the side walls (cut away in the figure and thus not shown) of the housing. Hologram lenses 505 and 506 are inserted into the housing 507, but not fixed. In a separate procedure the laser chip 502 is attached to power detector chip 503. Then detector chips 501 and 502 are die attached to the circuit board. The circuit board 500 is then attached to the housing 507 by pins 511a and 511b. At that point the integrated device is ready for alignment.

Figure 6:
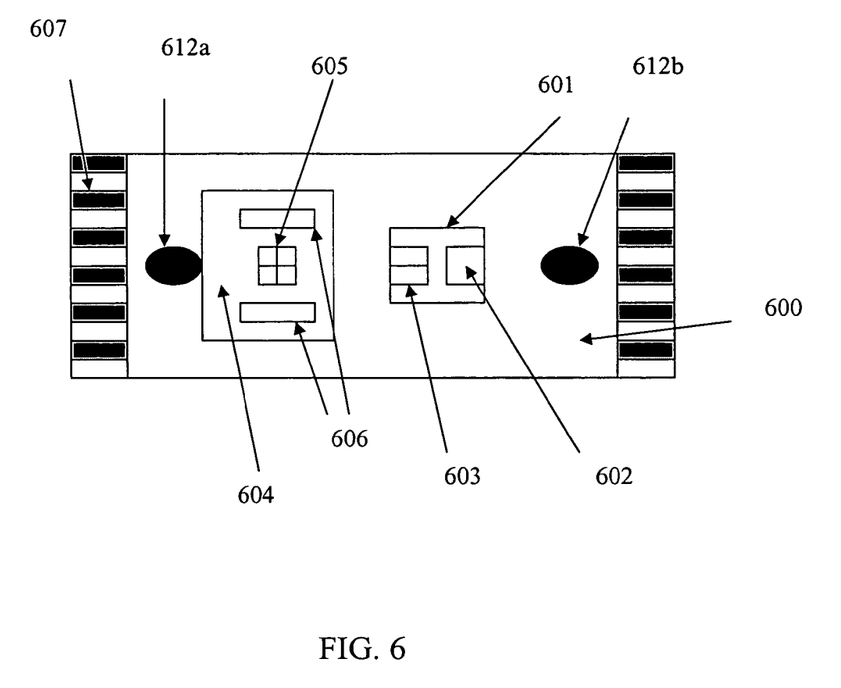
FIG. 6 is a top view of a circuit board containing a laser and detector according to an embodiment of the invention.

FIG. 6 shows the details of the components on the circuit board. Detector chip 604 has six light sensitive elements. Quadrant detector 605 is for detecting the focus error and the information signal. Detectors 606 are the tracking sensors. The laser submount 601 has a light sensitive element 602 for detecting the back emissions from the laser chips 603. Holes 612a and 612b are for adjusting the position of the detector relative to the center axis of the housing 507. Electrical connections to the devices on the circuit board are done through bonding pads 607a and 607b.

Figure 7A:
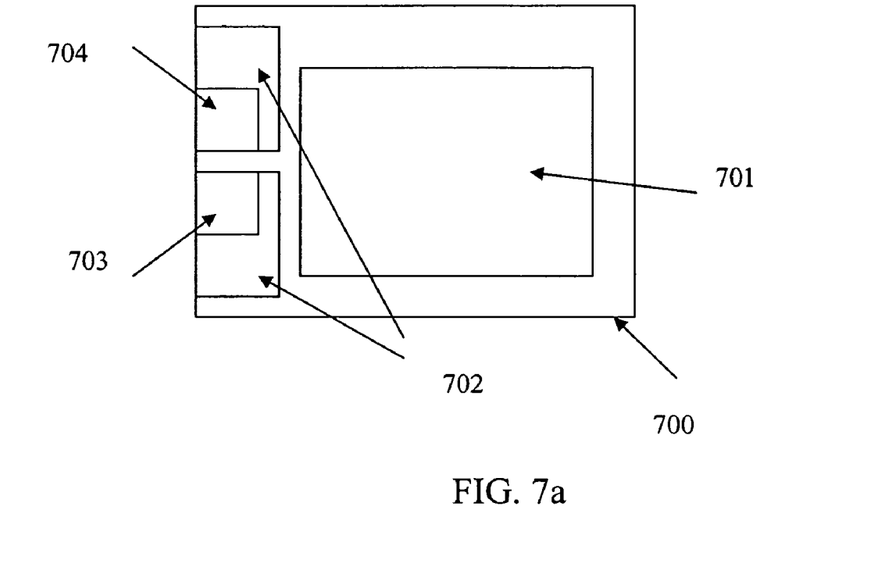
FIG. 7a is a diagram of details of a power monitor detector chip according to an embodiment of the present invention.
Figure 7B:
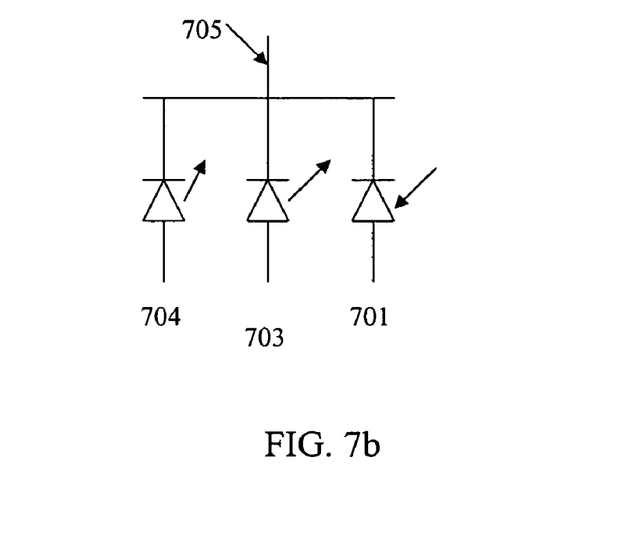
FIG. 7b is a diagram of the electrical connections of the lasers and the power monitor detector according to an embodiment of the present invention.

FIG. 7(a) shows the detailed structure of the laser submount 700. Two metal pads 702a and 702b are plated on the submount and they are electrically isolated from each other and from the submount. Lasers 704 and 703 are die attached on pads 702a and 702b respectively. Behind the metal pads 702 is a light sensitive element 701 which is used to monitor the back emission from the lasers. In most optical heads the cathodes of lasers and the power monitor detector are electrically connected as shown in FIG. 7(b).

Figure 8:
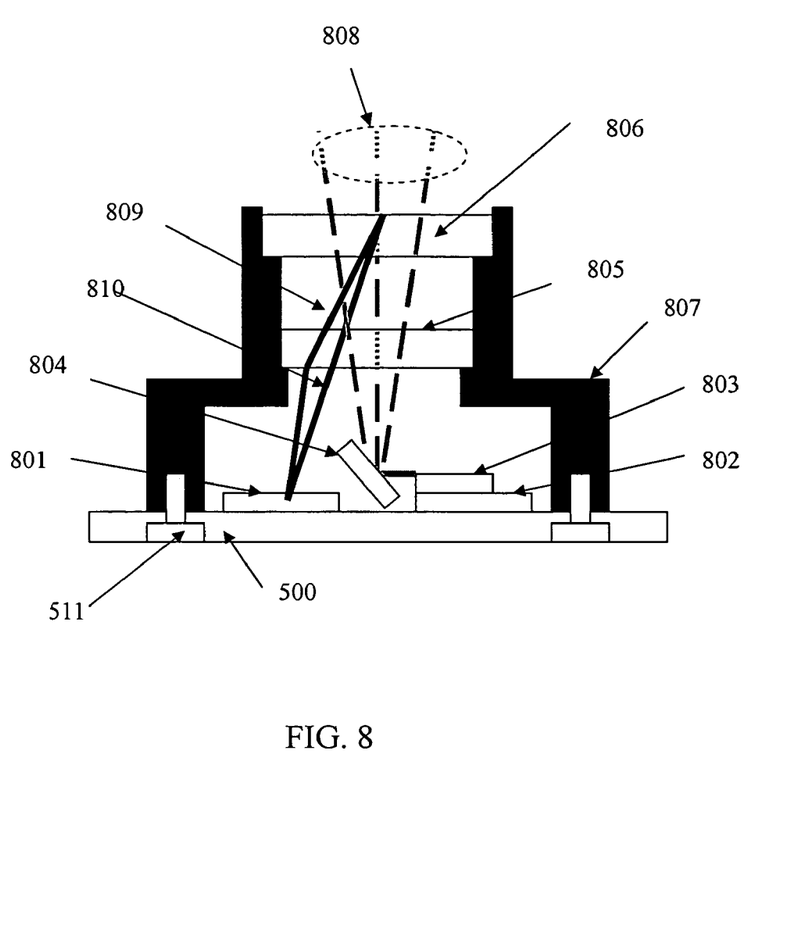
FIG. 8 is a diagram of a second embodiment of the present invention.

A second embodiment of the present invention is shown in FIG. 8. In this design the hologram lens 806 is visible by both laser wavelengths. The second hologram lens 805 is only visible to the long wavelength of the lasers. As a result, the returned light from the laser with the short wavelength is diffracted by hologram lens 806 and its diffracted beam 810 is not impeded by hologram lens 805 to reach the detector 801. However, when the returned beam from the laser with the long wavelength reaches hologram lens 806, its diffracted beam 809 is again diffracted by hologram lens 805 to reach the same detector 801. The alignment process for this second embodiment is to first adjust the circuit board and hologram lens 806 so that the returned beam from the laser with the short wavelength is at the center of the detector. Then hologram 805 is adjusted to place the returned beam from the laser with the long wavelength at the center of the detector. Hologram lens 805 also contains a structure to correct for the aberration in hologram lens 806 as a result of the change in the wavelength. The aberration correction is important, because certain beam characteristics is required on the detector to properly produce the focus error signals.

Figure 9:
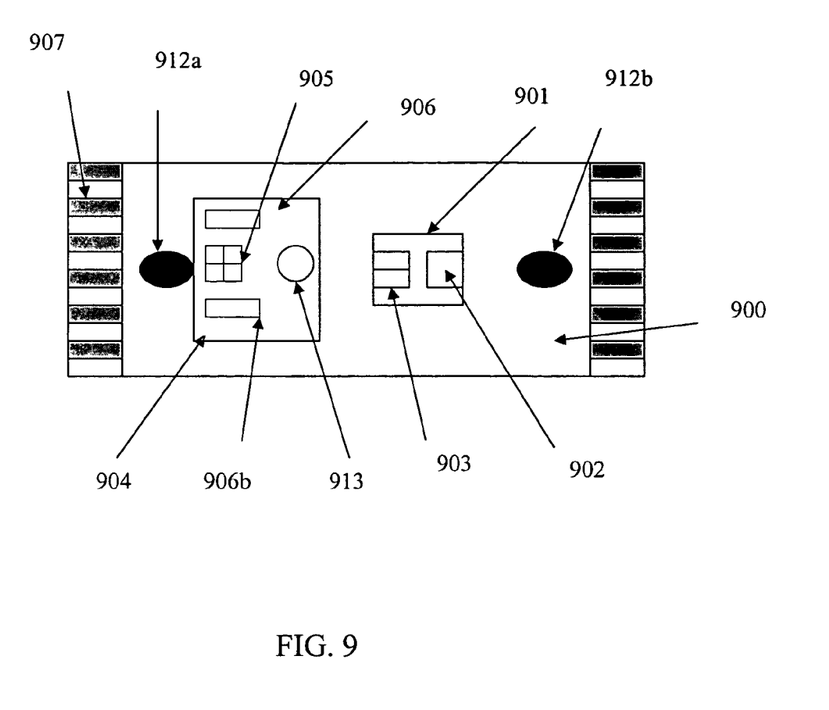
FIG. 9 is a diagram of a third embodiment of the present invention with a partially transmissive mirror.

A third embodiment of the present invention is shown in FIG. 9. The integrated device is similar to devices shown in either FIG. 5 or FIG. 8, except that the mirror is 90% reflective. The 10% light beam transmitting through the mirror is detected by a forward power monitor 913. Alternately, the mirror could be 80% reflective, or any other substantial percentage. This embodiment is useful when the lasers are also used for recording on the medium as well as being used for reading information.

Figure 10:
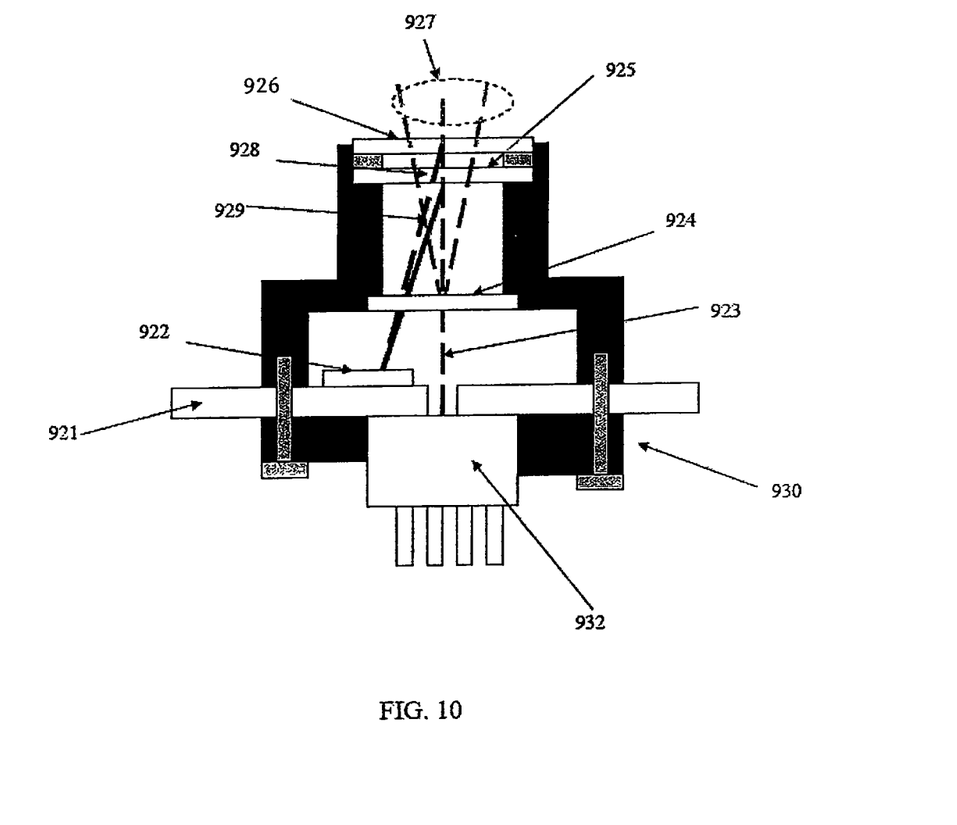
FIG. 10 is a diagram of another embodiment of the present invention without using a mirror.

FIG. 10 is another embodiment of the present invention without using a mirror. The PCB 921 contains only the detector chip 922. The light source for the device is provided by a laser package which can emit light with two distinct wavelengths. Laser beam 923 is emitted by one of the laser sources. A grating device 924 diffracts the incident laser beams into 3 beams as indicated by 927. When a laser beam of a first wavelength is returned from the medium surface, it is diffracted by a hologram device 925 to the detector 922. On the other hand, the laser beam of the second wavelength returned from the medium surface is diffracted by a hologram device 926 to the same detector 922. The laser device 932, the PCB with the detector and the diffractive components are held together by a housing 930.

In one version of the embodiment of FIG. 10, the opening above the laser is sufficiently large to allow the circuit board with the detectors to be moved left or right, while the laser chip is stationary, to adjust the position of the returned beam.

As will be understood by those of skill in the art, variations to the described embodiments can be made within the scope of the invention. Accordingly, the foregoing description is intended to be descriptive, but not limiting, of the scope of the invention which is set forth in the appended claims.

What is claimed is:

1. A method for assembling a laser and detector device comprising
    providing a housing;
    providing a substrate;
    mounting a laser on said substrate;
    mounting a photodetector on said substrate in said housing;
    temporarily attaching said substrate to said housing;
    mounting a mirror in said housing in a position to intercept a laser beam from said laser;
    determining if there is a placement error such that said photodetector is not under a returned beam;
    if a placement error is determined, moving said substrate with said laser and photodetector separately from said mirror in a direction toward or away from said mirror until said photodetector is under said returned beam, without moving the position of said returned beam, before permanently fixing said substrate to said housing; and
    permanently fixing said substrate to said housing.

2. The method of claim 1 further comprising:
    mounting a first hologram between said laser and a medium; and
    moving said first hologram to adjust a position of a first returned light beam of a first wavelength on said photodetector.

3. The method of claim 1 further comprising:
    mounting said photodetector on a substrate above said laser, said substrate having an opening allowing passage of a laser beam from said laser; and
    moving said substrate laterally without blocking said laser beam.

4. The method of claim 1 further comprising:
    mounting a first hologram to intercept a beam from said laser reflected off said mirror;
    moving said first hologram to adjust a position of a first returned light beam of a first wavelength on said detector;
    mounting a second hologram to intercept a beam from said laser reflected off said mirror; and
    moving said second hologram independent of said first hologram to adjust a position of a second returned light beam of a second wavelength on said detector.

5. The method of claim 4 wherein said first and second returned light beams are short and long wavelength laser beams.

6. The method of claim 5 wherein said two different wavelength laser beams are emitted by a single laser chip.

7. The method of claim 5 wherein said two different wavelength laser beams are emitted by two separate laser chips.

8. The method of claim 5 wherein said first hologram is substantially visible to only said short wavelength laser beam and said second hologram is substantially visible to only said long wavelength laser beam.

9. The method of claim 5 wherein one of the returned beams is diffracted a second time by said second hologram.

10. The method of claim 9 wherein said second hologram is patterned to also correct for the aberrations resulting from the first hologram.

\* \* \* \* \*